(12) United States Patent
Weder

(10) Patent No.: US 6,226,853 B1
(45) Date of Patent: *May 8, 2001

(54) METHOD FOR FORMING A DECORATIVE COVER

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/369,775

(22) Filed: Aug. 6, 1999

Related U.S. Application Data

(63) Continuation of application No. 08/986,269, filed on Dec. 5, 1997, now abandoned, which is a continuation of application No. 08/467,416, filed on Jun. 6, 1995, now Pat. No. 5,704, 109, which is a continuation of application No. 07/926,098, filed on Aug. 5, 1992, now Pat. No. 5,809,629.

(51) Int. Cl.[7] .................................................. B23Q 3/00
(52) U.S. Cl. .............................. 29/469.5; 29/525; 29/505
(58) Field of Search .................................. 29/469.5, 505, 29/525; 53/464

(56) References Cited

U.S. PATENT DOCUMENTS

| D. 315,700 | * | 3/1991 | Stephens . |
| D. 404,684 | * | 1/1999 | Shea . |

(List continued on next page.)

FOREIGN PATENT DOCUMENTS

| 560532 | 4/1975 | (CH) . |
| 1166692 | 3/1964 | (DE) . |
| 8905250 | 10/1989 | (DE) . |
| 299524 | 4/1992 | (DE) . |
| 1376047 | 9/1964 | (FR) . |
| 1393725 | 2/1965 | (FR) . |
| 2137325 | 12/1972 | (FR) . |
| 2467796 | 4/1981 | (FR) . |
| 2610604 | 8/1988 | (FR) . |
| 2619698 | 3/1989 | (FR) . |
| 1096058 | 12/1967 | (GB) . |
| 2128083 | 4/1984 | (GB) . |
| 2252708 | 8/1992 | (GB) . |
| 4158036 | 6/1992 | (JP) . |
| 9003311 | 4/1990 | (WO) . |

OTHER PUBLICATIONS

Color Them Happy With Highlander® Products, ©1922, 2 pages.
Super Seller, Supermarket Floral, Sep. 15, 1992.
Costa Keeps the Christmas Spirit, Supermarket Floral, Sep. 15, 1992.
Now, More Than Ever, Supermarket Floral, Sep. 15, 1992.
Halloween, Link Magazine, Sep. 1992, 2 pages.
Speed Cover® Brochure—The Simple Solution . . . , ©1989.
Speed Sheets and Speed Rolls Brochure, ©1990.
"Derwent Abstract" of FR 2610604A. It is noted that the abstract is an incorrect English translation of the contents of the French patent. The French patent does not enable or disclose adhesively attaching the covering to the container. 1988.

*Primary Examiner*—S. Thomas Hughes
*Assistant Examiner*—Steven Blount
(74) *Attorney, Agent, or Firm*—Dunlap, Codding & Rogers, P.C.

(57) ABSTRACT

A sheet of material formed about a flower pot to provide a decorative cover wherein a portion of the sheet of material near an outer peripheral surface thereof extends above an upper end of the flower pot and such portion is crimped to assist in holding the sheet of material formed about the flower pot. The crimping is accomplished by forming overlapping folds in the crimp portion of the sheet of material or by connecting the crimp portion to a portion of the flower pot by way of a bonding material or by way of a drawstring or ribbon or by way of reinforcing members in the sheet of material or by way of a shrinkable material formed in the sheet of material for example.

19 Claims, 7 Drawing Sheets

U.S. PATENT DOCUMENTS

| | | | |
|---|---|---|---|
| D. 419,436 | * 1/2000 | Celtorius et al. . | |
| 1,446,563 | 2/1923 | Hughes . | |
| 1,610,652 | 12/1926 | Bouchard . | |
| 1,868,853 | * 7/1932 | Sievers . | |
| 2,152,648 | 4/1939 | Jones | 47/34 |
| 2,302,259 | * 11/1942 | Rothfuss . | |
| 2,355,559 | 8/1944 | Renner | 229/8 |
| 2,621,142 | 12/1952 | Wetherell | 154/117 |
| 2,648,487 | 8/1953 | Linda | 229/55 |
| 2,845,735 | 8/1958 | Werner | 41/37 |
| 3,094,810 | 6/1963 | Kalpin | 47/37 |
| 3,130,113 | 4/1964 | Silman | 161/97 |
| 3,271,922 | 9/1966 | Wallerstein et al. | 53/3 |
| 3,316,675 | 5/1967 | Cartwright | 47/37 |
| 3,557,516 | 1/1971 | Brandt | 53/14 |
| 3,962,503 | * 6/1976 | Crawford . | |
| 4,216,620 | 8/1980 | Weder et al. | 47/72 |
| 4,413,725 | 11/1983 | Bruno et al. | 206/45.33 |
| 4,733,521 | 3/1988 | Weder et al. | 53/580 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,980,209 | * 12/1990 | Hill . | |
| 5,105,599 | 4/1992 | Weder | 53/399 |
| 5,111,638 | 5/1992 | Weder | 53/397 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,239,775 | 8/1993 | Landau | 47/72 |
| 5,259,106 | 11/1993 | Weder et al. | 29/469.5 |
| 5,339,601 | 8/1994 | Weder et al. | 79/469.5 X |
| 5,450,707 | 9/1995 | Weder et al. | 53/399 |
| 5,501,059 | 3/1996 | Weder et al. | 53/397 |
| 5,542,169 | * 8/1996 | Weder . | |
| 5,560,488 | 10/1996 | Weder | 53/397 X |
| 5,609,009 | 3/1997 | Weder et al. | 53/399 |
| 5,625,936 | 5/1997 | Weder | 29/469.5 |
| 5,632,077 | 5/1997 | Weder | 29/469.5 |
| 5,704,109 | 1/1998 | Weder | 53/397 X |

* cited by examiner

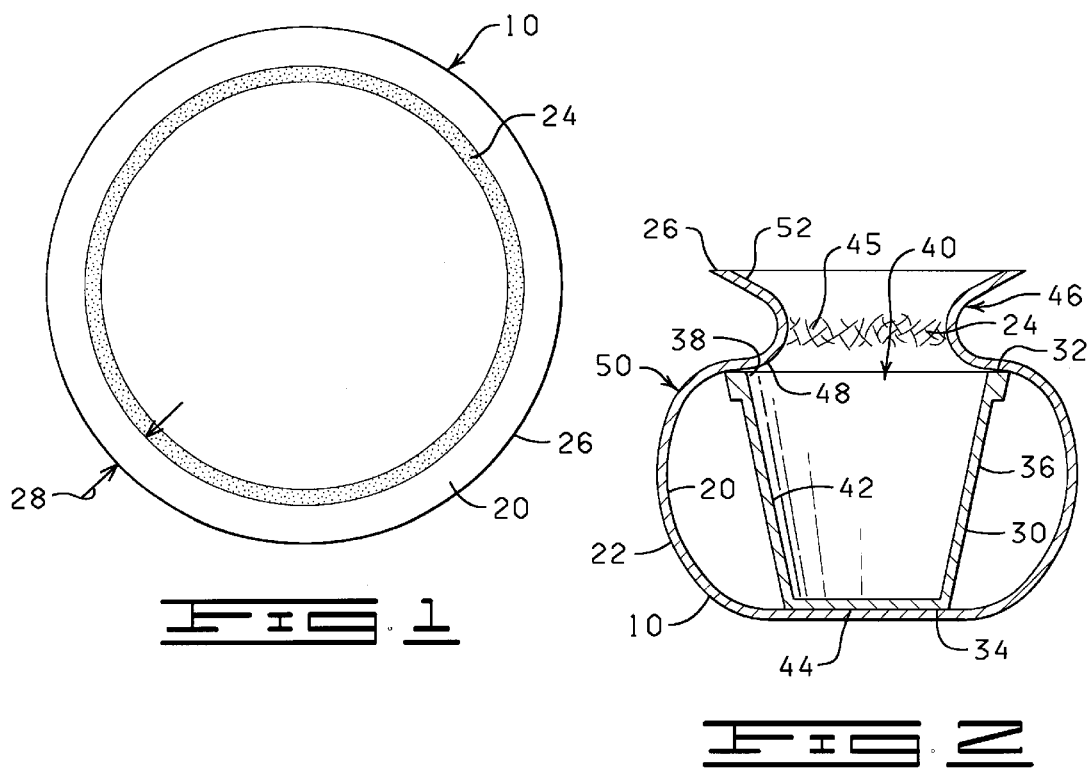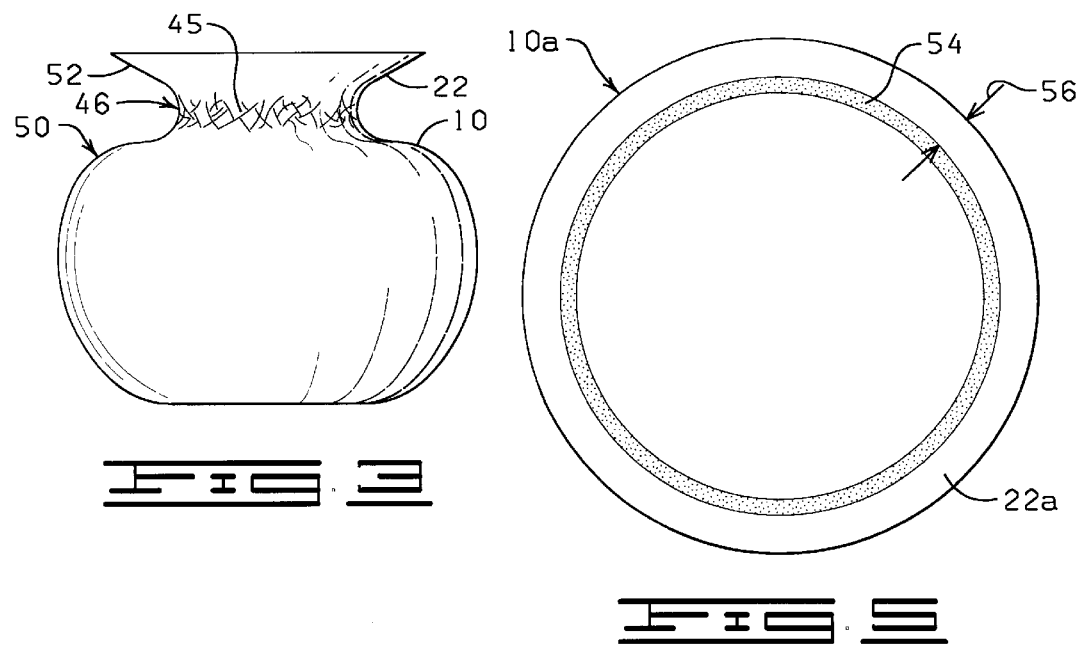

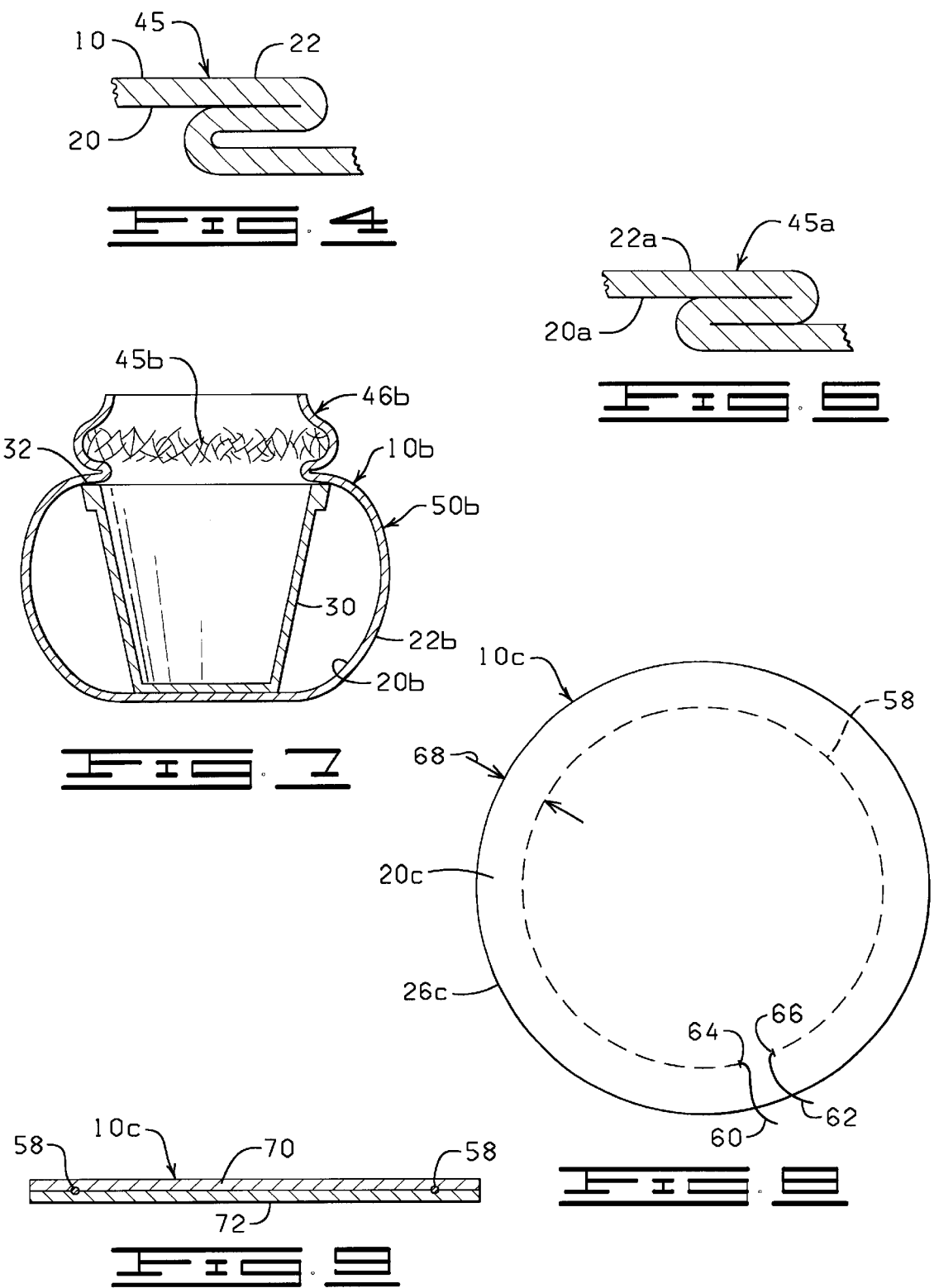

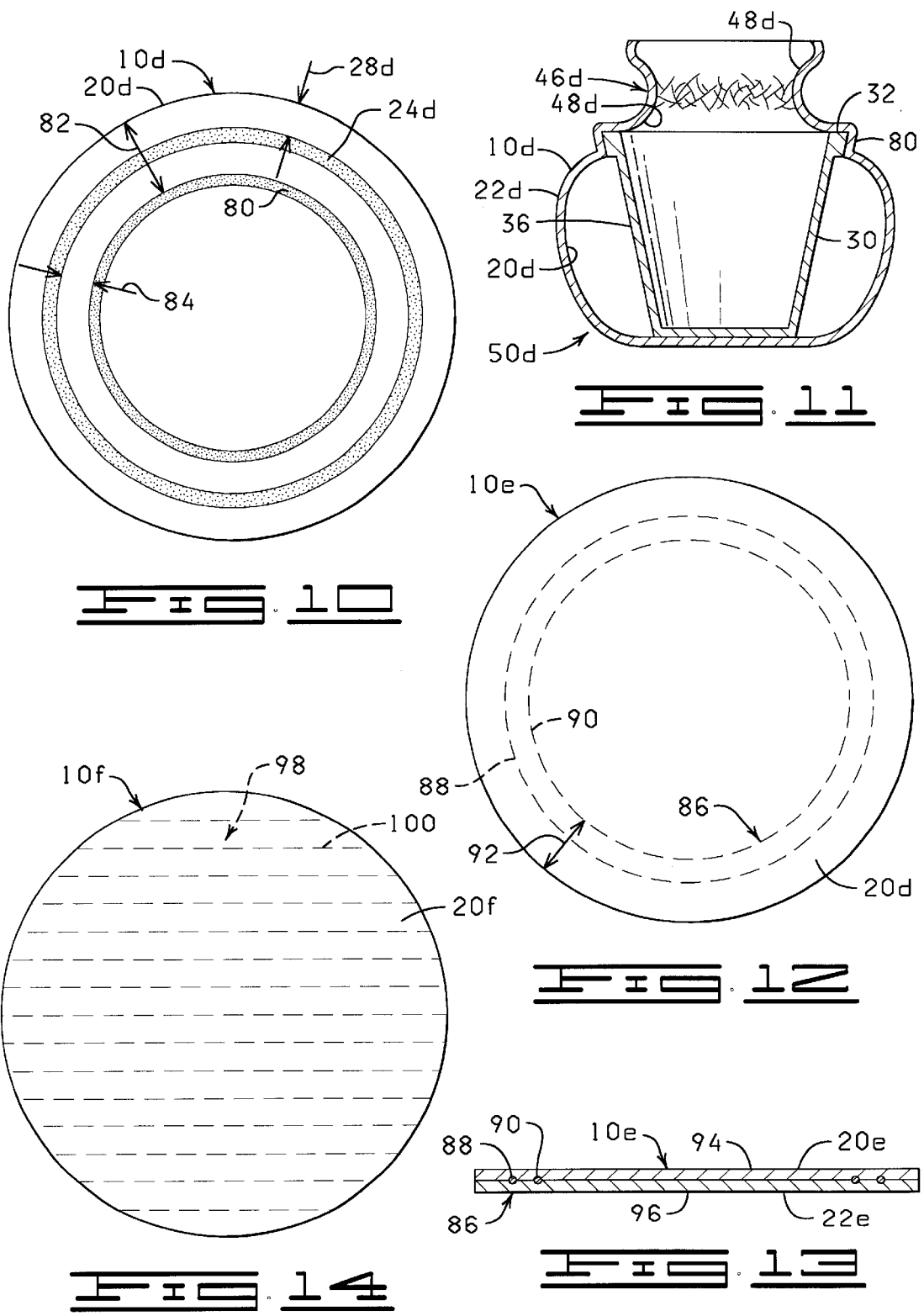

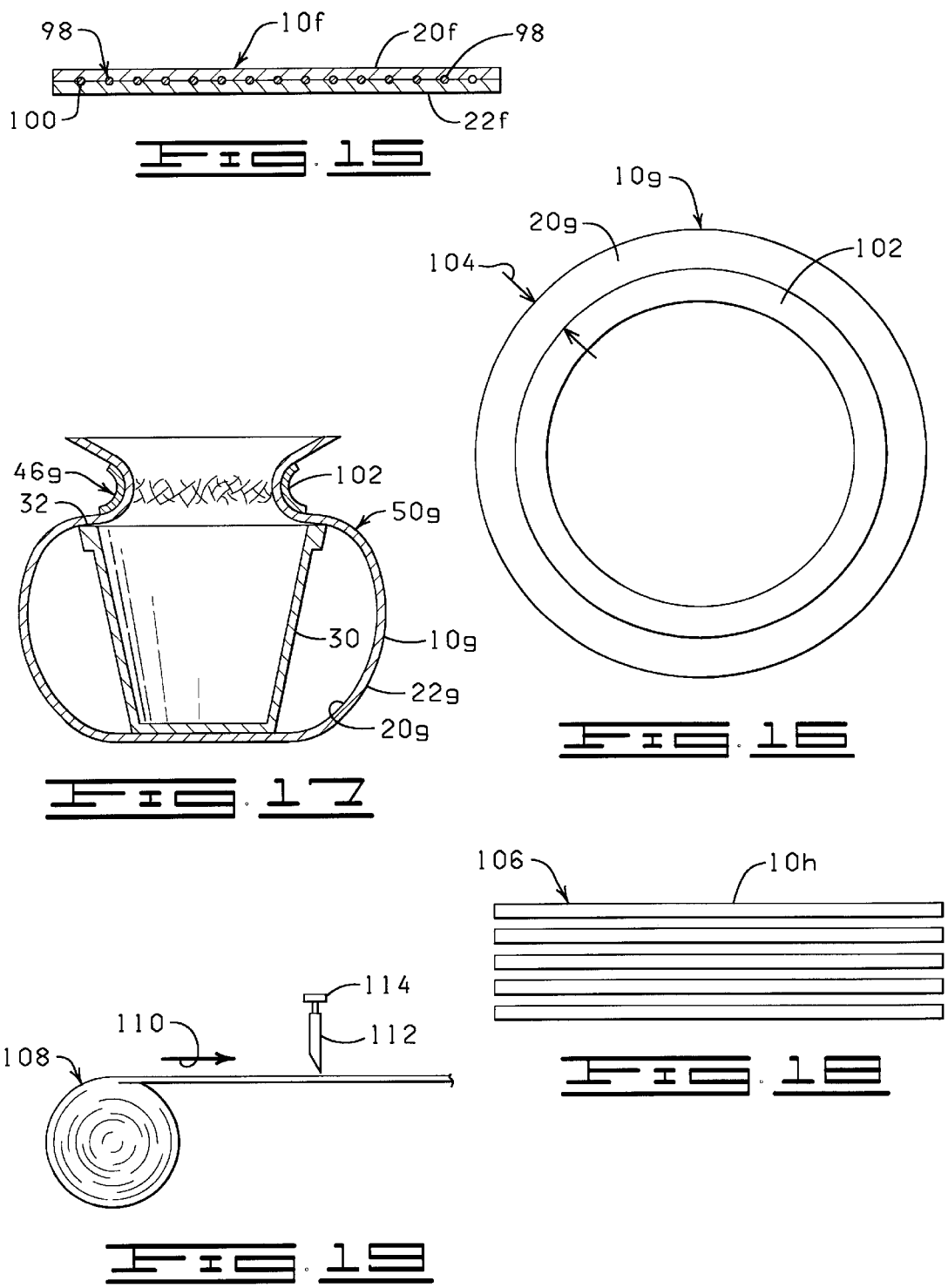

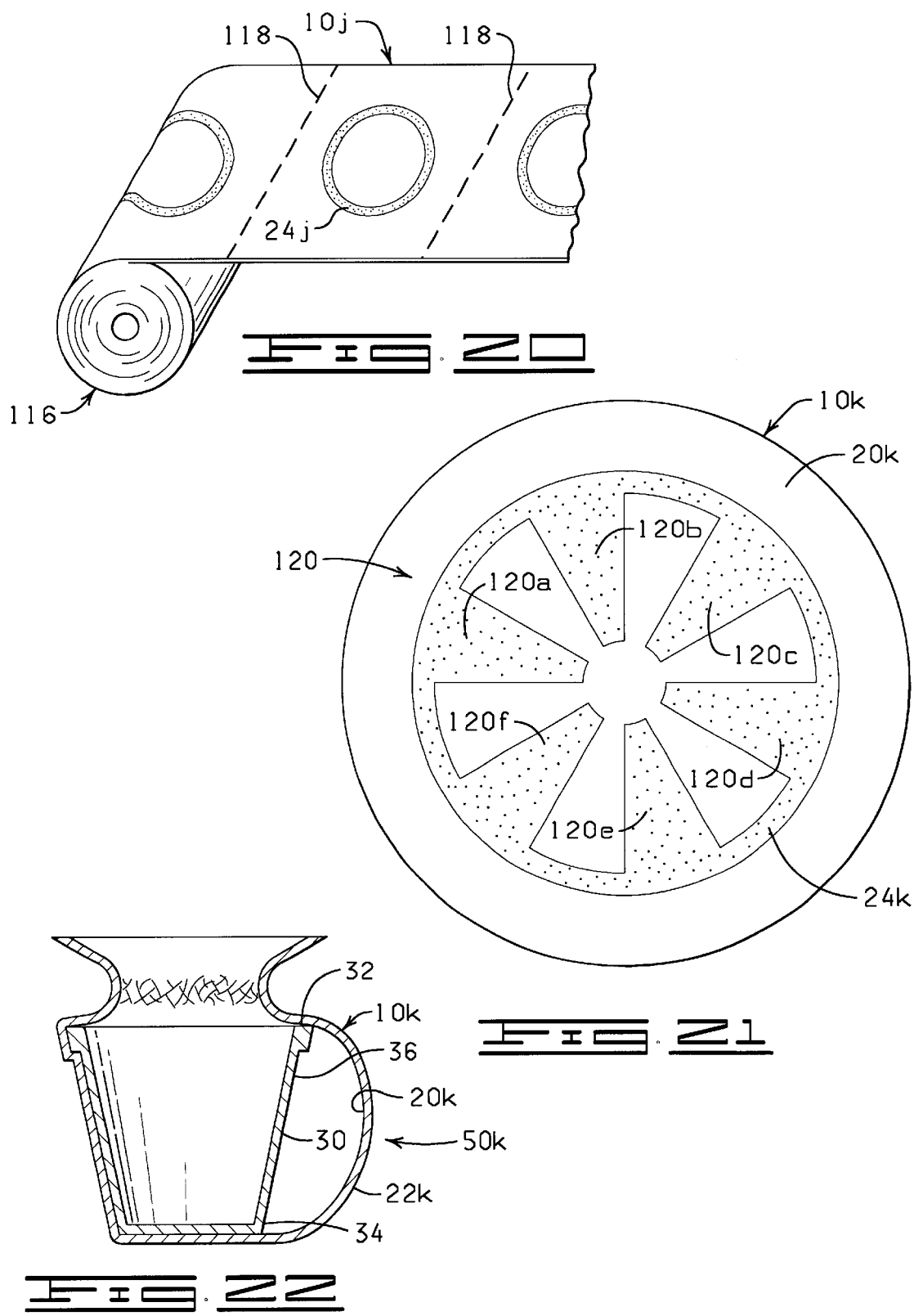

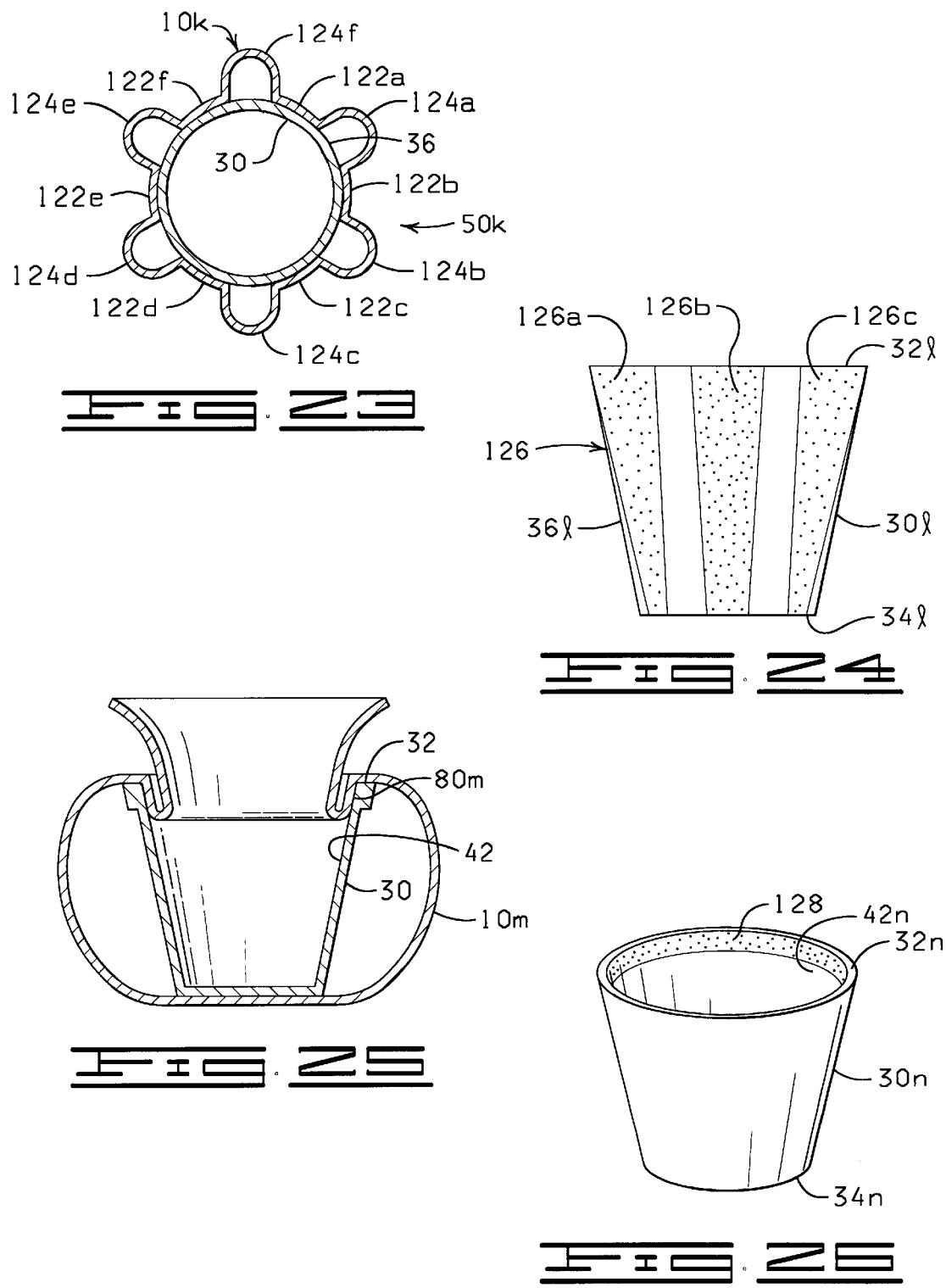

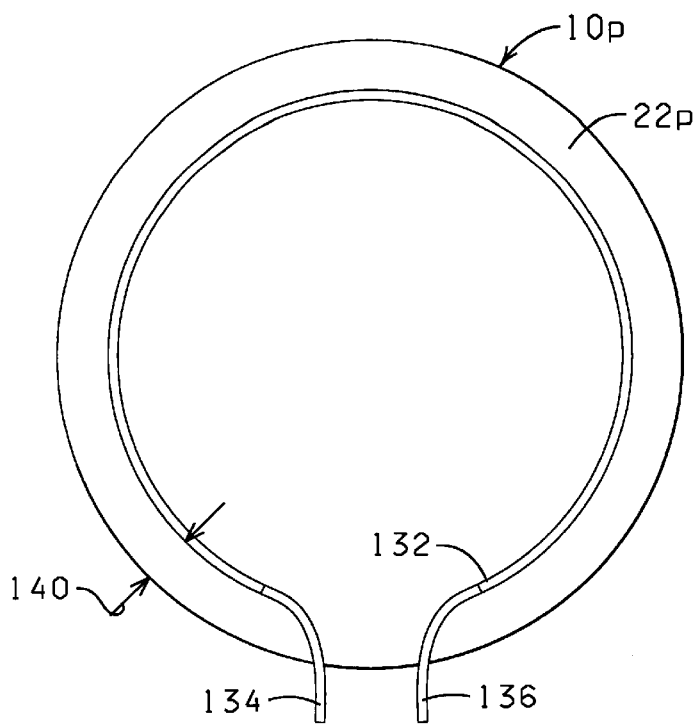
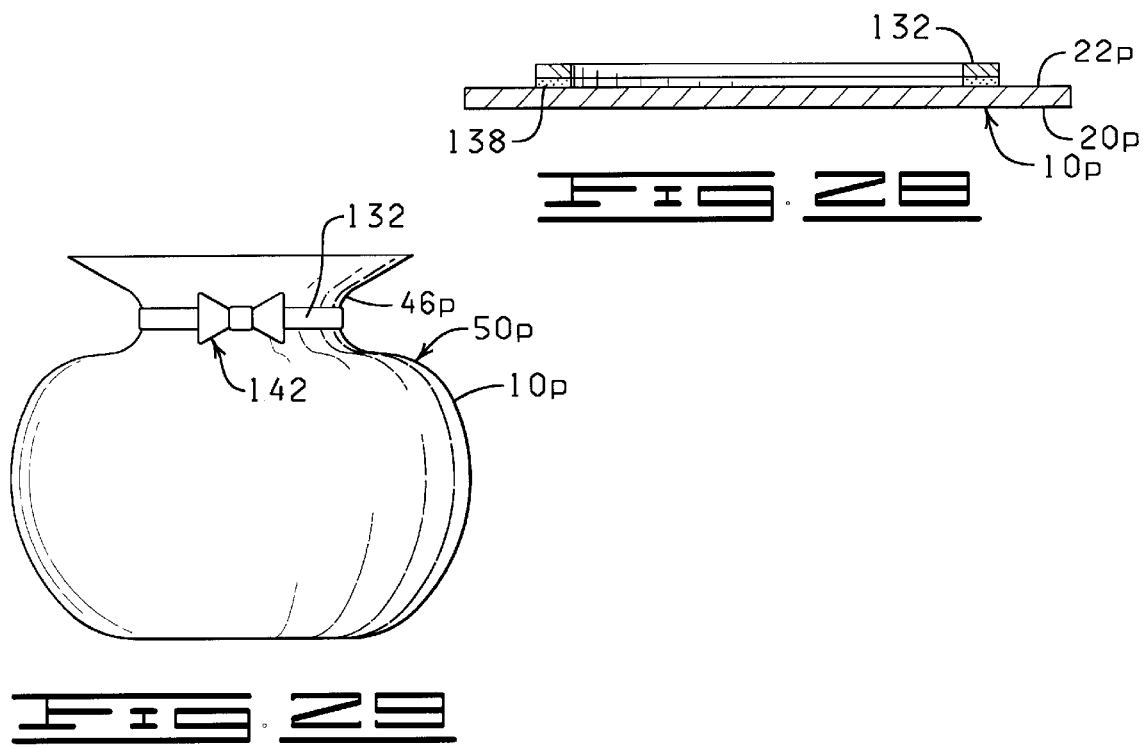

METHOD FOR FORMING A DECORATIVE COVER

RELATED REFERENCES

This Application is a continuation of U.S. Ser. No. 08/986,269, filed Dec. 5, 1997 now abandon, entitled "METHOD AND APPARATUS FOR FORMING A DECORATIVE COVER", which is a continuation of U.S. Ser. No. 08/467,416, filed Jun. 6, 1995, now U.S. Pat. No. 5,704,109, issued Jan. 6, 1998, entitled "METHOD FOR FORMING A DECORATIVE COVER", which is a continuation of U.S. Ser. No. 07/926,098, filed Aug. 5, 1992, now U.S. Pat. No. 5,809,629, issued Sep. 22, 1998, entitled "METHOD AND APPARATUS FOR FORMING A DECORATIVE COVER".

FIELD OF THE INVENTION

The present invention relates generally to decorative covers for flower pots and, more particularly, but not by way of limitation, to a decorative cover formed from a sheet of material wherein a portion of the sheet of material is held above the upper end of a flower pot to assist in holding the sheet of material formed about the flower pot to provide the decorative cover.

BRIEF DESCRIPTION OF THE DRAWINGS

FIG. 1 is a plan view showing the upper surface of a sheet of material constructed in accordance with the present invention.

FIG. 2 is a cross-sectional view showing the sheet of material of FIG. 1 wrapped about a flower pot in accordance with the present invention.

FIG. 3 is a perspective view showing the sheet of material wrapped about the flower pot as shown in FIG. 2 with the flower pot not being shown in FIG. 3.

FIG. 4 is a cross-sectional view of a portion of the sheet of material crimped to form an overlapping fold.

FIG. 5 is a plan view of the lower surface of a modified sheet of material.

FIG. 6 is a cross-sectional view showing a portion of the sheet of material of FIG. 5 crimped to form an overlapping fold.

FIG. 7 is a cross-sectional view showing a sheet of material wrapped about a flower pot to form a modified decorative cover.

FIG. 8 is a plan view of the upper surface of another modified sheet of material.

FIG. 9 is a cross-sectional view of the sheet of material of FIG. 8.

FIG. 10 is a plan view of the upper surface of yet another modified sheet of material.

FIG. 11 is a cross-sectional view showing the modified sheet of material of FIG. 10 wrapped about a flower pot.

FIG. 12 is a plan view of the upper surface of still another modified sheet of material.

FIG. 13 is a cross-sectional view of the sheet of material of FIG. 12.

FIG. 14 is a plan view of the upper surface of still another modified sheet of material.

FIG. 15 is a cross-sectional view of the sheet of material of FIG. 14.

FIG. 16 is a plan view of the lower surface of still another modified sheet of material.

FIG. 17 is a cross-sectional view of the sheet of material of FIG. 16 wrapped about a flower pot.

FIG. 18 is an elevational view of a pad of sheets of material constructed in accordance with the present invention.

FIG. 19 is an elevational view of a roll of material for providing sheets of material in accordance with the present invention.

FIG. 20 is a perspective view of the roll of material for providing sheets of material in accordance with the present invention.

FIG. 21 is a plan view of the upper surface of yet another modified sheet of material.

FIG. 22 is a cross-sectional view showing the sheet of material of FIG. 21 wrapped about a flower pot.

FIG. 23 is a cross-sectional view of the sheet of material of FIG. 21 wrapped about a flower pot with the section taken along the horizontal plane as compared to the section taken along the vertical plane shown in FIG. 22.

FIG. 24 is an elevational view of a modified flower pot for cooperating to connect the sheet of material thereto.

FIG. 25 is a cross-sectional view showing a sheet of material wrapped about a flower pot for forming yet another modified decorative cover.

FIG. 26 is a perspective view of a modified flower pot for cooperating to secure a sheet of material wrapped thereabout to form a modified decorative cover like the decorative cover shown in FIG. 25.

FIG. 27 is a plan view of the lower surface of still another modified sheet of material having a ribbon connected thereto.

FIG. 28 is a cross-sectional view of the modified sheet of material shown in FIG. 27.

FIG. 29 is an elevational view of the sheet of material of FIG. 27 wrapped about a flower pot (not shown) to form another modified decorative cover.

DESCRIPTION OF THE PREFERRED EMBODIMENTS

Shown in FIG. 1 and designated by the general reference number 10 is a sheet of material constructed in accordance with the present invention and having an upper surface 20 (FIG. 1) and a lower surface 22 (FIG. 2).

A connecting bonding material 24 is disposed on the upper surface 20 of the sheet of material 10. The sheet of material 10 has an outer peripheral edge 26. The connecting bonding material 10 is disposed near and spaced a distance 28 from the outer peripheral surface 26 of the sheet of material 10 and extends generally circumferentially about the sheet of material 10.

The sheet of material 10 shown in FIG. 1 is circularly shaped and the connecting bonding material 24 extends in a circularly shaped pattern over the upper surface 20 of the sheet of material 10. The sheet of material 10 may be any geometric shape such as square or rectangular or heart shaped or trapezoidally shaped or any other geometric shape. Further, the connecting bonding material 24 may extend in any geometric pattern over the upper surface 20 of the sheet of material 10, and the circularly shaped pattern is shown in FIG. 1 only by way of example.

The sheet of material 10 and the other sheets of material described herein are constructed from any suitable flexible material that is capable of being wrapped about a flower pot as described herein. Preferably, the sheet of material 10 is constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 has a thickness in a range from about 0.1 mil to about 30 mils. Preferably, the sheet of material 10 has a thickness in a range from about 0.1 mil to about 5 mils.

The sheet of material 10 may be constructed of a single layer of material or a plurality of layers of the same or different types of materials. Any thickness of the sheet of material 10 may be utilized in accordance with the present invention as long as the sheet of material 10 is wrappable or formable about a flower pot in the manners described herein. The layers of material comprising the sheet of material 10 may be connected together or laminated or may be separate layers.

A decorative pattern, such as a color and/or an embossed pattern, and/or other decorative surface ornamentation may be applied to the upper surface 20 and/or the lower surface 22 of the sheet of material 10 or portions thereof including, but not limited to printed designs, coatings, colors, flocking or metallic finishes. The sheet of material 10 also may be totally or partially clear or tinted transparent material.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material 10 and, in this instance, heat also must be applied to effect the sealing. The term "bonding material" as used herein means any type of material or thing which can be used to effect the bonding or connecting of the two adjacent portions of the sheet of material 10 to effect the connection or bonding described herein. The term "bonding material" also includes other forms of effecting the bonding described herein such as chemical welds or heat fusion or welding by way of example only.

The connecting bonding material 24 is shown in FIG. 1 as being applied to the upper surface 20 of the sheet of material 10 in the form of a circularly shaped strip. The connecting bonding material 24 may be applied in the form of spots or spaced apart strips and the spots may be any geometric pattern or any other type of pattern such as a logo for example. Further, the connecting bonding material 24 may include a color to obscure the fact that the connecting bonding material 24 is disposed on the sheet of material 10.

Shown in FIG. 2 is a flower pot 30 having an upper end 32, a lower end 34 and an outer peripheral surface 36. An opening 38 is formed through the upper end 32 of the flower pot 30 providing access to a retaining space 40. The retaining space 40 is sized to accommodate growing medium such as soil for example and at least a portion of a botanical item such as a plant or flower for example.

The retaining space 40 forms an inner peripheral surface 42 in the flower pot 30. A bottom 44 of the flower pot 30 is disposed at the lower end 34 and cooperates to enclose or partially enclose the retaining space 40. The flower pot 30 may be any conventional, commercially available flower pot well known in the art.

The flower pot 30 is placed on the upper surface 20 of the sheet of material 10. More particularly, the bottom 44 of the flower pot 30 is disposed on a central portion of the sheet of material 10. In this position, the connecting bonding material 24 extends circumferentially about the flower pot 30 and the connecting bonding material 24 is spaced a distance from the flower pot 30.

The sheet of material 10 then is formed about the flower pot 30 to a position wherein the sheet of material 10 extends about and encompasses substantially the entire outer peripheral surface 36 of the flower pot 30. In this position, a portion of the sheet of material 10 is disposed adjacent the bottom 44 of the flower pot 10 and portions of the sheet of material 10 extend upwardly and encompass the entire outer peripheral surface 36 of the flower pot 30 between the upper end 32 and the lower end 34 of the flower pot 10. The portions of the sheet of material 10 extending over the outer peripheral surface 36 are spaced a distance from the outer peripheral surface 36 of the flower pot 30 to provide a blossom type affect.

When the sheet of material 10 is formed about the flower pot 30, a portion of the sheet of material 10 near the outer peripheral surface 26 thereof extends a distance above the upper end 32 of the flower pot 30 as shown in FIG. 2. Further, when the sheet of material 10 is formed about the flower pot 30, the sheet of material 10 is sized and the connecting bonding material 24 is positioned on the upper surface 20 of the sheet of material 10 so that the connecting bonding material 24 is disposed a distance above the upper end 32 of the flower pot 30.

In this position, the portion of the sheet of material 10 disposed near and about the connecting bonding material 24 is crimped by bringing together portions of the sheet of material 10 near and about the connecting bonding material 24 so that portions of the sheet of material near and about the connecting bonding material 24 are disposed adjacent each other and the adjacent portions of the sheet of material 10 are connected by way of the connecting bonding material 24 thereby forming a plurality of overlapping folds 45 in the portion of the sheet of material 10 near and about the connecting bonding material 24. The connected overlapping folds 45 extend at various distances and at various angles. The connected overlapping folds 45 in the area near and about the portion of the sheet of material 10 containing the connecting bonding material 24 is designated in FIG. 2 by the reference numeral 46 and sometimes referred to herein as the crimped portion 46.

A portion of a typical overlapping fold 45 is shown in cross-section FIG. 4. The adjacent portions of the sheet of material 10 on the upper surface 20 are shown in FIG. 4 as being connected while the adjacent portions of the sheet of material 10 on the lower surface 22 are unconnected since no connecting bonding material is disposed on the lower surface 22. It should be noted that a connecting bonding material also can be disposed on the lower surface 22 for connecting adjacent portions of the lower surface 22 in the crimped portion 46 if desired and as described in more detail below.

The crimped portion 46 extends circumferentially about the upper end 32 of the flower pot 30. The crimped portion 46 also extends a distance inwardly from the upper end 32 of the flower pot 30 toward a central portion of the retaining space 40 thereby forming a ridge portion 48 extending circumferentially about the flower pot 30 generally near the upper end 32 of the flower pot 30. The crimped portion 46 and the ridge portion 48 thereof cooperate to engage the upper end 32 of the flower pot 30 to assist and cooperate in holding the sheet of material 10 formed about the flower pot 30 to provide a decorative cover 50 (FIGS. 2 and 3).

The crimped portion 48 when formed preferably causes adjacent portions of the upper and lower surfaces 20 and 22 of the sheet of material 10 to be brought together or positioned adjacent each other. The crimped portion 46 and the other crimped portions shown in the drawings are shown in an expanded form where the portions of the lower surface 22 are not disposed adjacent each other for the purpose of illustration and because this expanded form may be desired in some applications.

The portion of the sheet of material 10 extending between the connecting bonding material 24 and the outer peripheral edge 26 of the sheet of material 10 extends a distance above the crimped portion 46 and is flared outwardly and extends a distance radially outwardly from the crimped portion 46 to form a flared portion 52. The flared portion 52 extends circumferentially about the decorative cover 50 and circumferentially about the upper end 32 of the flower pot 30.

In this embodiment, the connecting bonding material 24 preferably is a pressure sensitive adhesive or a cohesive, although the connecting bonding material 24 could be in any of the other forms described before.

The upper surface 20 of the sheet of material 10 forms an inner peripheral surface of the decorative cover 50 and the lower surface 22 of the sheet of material 10 forms an outer peripheral surface of the decorative cover 50. The inner peripheral surface of the decorative cover 50 formed by the upper surface 20 of the sheet of material 10 is disposed adjacent the bottom 44 of the flower pot 30. The inner peripheral surface of the decorative cover 50 formed by the upper surface 20 is spaced a distance from the outer peripheral surface 36 of the flower pot 30.

As described above, the flower pot 30 is placed on the upper surface 20 of the sheet of material 10 which is formed about the flower pot 30 to form the decorative cover 50 with the upper surface 20 being disposed near the outer peripheral surface 36 of the flower pot 30 and the lower surface 22 providing the outer peripheral surface of the decorative cover 50. In the alternative, the flower pot 30 may be placed on the lower surface 22 of the sheet of material 10. In this last-mentioned embodiment, the sheet of material 10 is formed about the flower pot 30 in the manner exactly like that described before, except the lower surface 22 is disposed near the outer peripheral surface 36 of the flower pot 30 and the upper surface 20 forms the outer peripheral surface of the decorative cover 50 with the connecting bonding material 24 being disposed on the outer peripheral surface of the decorative cover 50.

Embodiment of FIGS. 5 and 6

Shown in FIG. 5 is a modified sheet of material 10a which is constructed exactly like the sheet of material 10 shown in FIG. 1 and described in detail before, except the sheet of material 10a includes a cohesive or pressure sensitive adhesive connecting bonding material 54 disposed on the lower surface 22a of the sheet of material 10a. The cohesive or pressure sensitive adhesive connecting bonding material 54 extends circumferentially about the lower surface 22a. The cohesive or pressure sensitive adhesive connecting bonding material 54 is spaced a distance 56 from the outer peripheral edge 26a of the sheet of material 10a. Preferably, the distance 56 corresponds or equals the distance 28 described before in connection with the sheet of material shown in FIG. 1.

The sheet of material 10a includes the connecting bonding material 24 (preferably a pressure sensitive adhesive or cohesive connecting bonding material) on the upper surface 20a of the sheet of material 10a exactly like that described before in connection with the sheet of material 10 shown in FIG. 1.

In this embodiment, the sheet of material 10a is formed about the flower pot 30 in a manner exactly like that described before in connection with the sheet of material 10 formed about the flower pot 30 as shown in FIG. 2, except in this embodiment, when the crimped portion like the crimped portion 46 (FIG. 2) is formed, the adjacent portions of the sheet of material 10a in the area containing the connecting bonding material 54 also will be bondingly connected (FIG. 6). Thus, in this embodiment, the adjacent portions of the sheet of material 10a on the upper surface 20a and the lower surface 22a are bondingly connected by way of the respective connecting bonding material 24 or the cohesive connecting bonding material 54.

Embodiment of FIG. 7

Shown in FIG. 7 is another modified sheet of material 10b which is constructed exactly like the sheet of material 10 shown in FIGS. 1–4 and described in detail before, except, in this embodiment, the crimped portion 46b extends a distance radially outwardly and circumferentially about the upper end 32 of the flower pot 30. The sheet of material 10b is formed about the flower pot 30 in the manner exactly like that described before with respect to the sheet of material 10 shown in FIGS. 1–4 and described in detail before, except the crimped portion 46b is formed to extend radially outwardly as opposed to radially inwardly in the manner described before in connection with the sheet of material 10 in the crimped portion 46 (FIGS. 1–4).

It should be noted that in connection with the sheet of material 10, 10a or 10b, the bottom 44 of the flower pot 30 may be placed on the lower surface 22, 22a and 22b the sheet of material 10, 10a or 10b and then formed about the flower pot 30 in the manner described before with the upper surface 20, 20a and 20b forming the outer peripheral surface of the decorative cover 50b in lieu of the lower surface 22 forming the outer peripheral surface of the decorative cover 50b in the manner described before in connection with the embodiments shown in FIGS. 1–7.

Embodiment of FIGS. 8 and 9

Shown in FIGS. 8 and 9 is another modified sheet of material 10c which is constructed exactly like the sheet of material 10 shown in FIGS. 1–4 and described in detail before, except the sheet of material 10c does not include the connecting bonding material 24. The sheet of material 10c includes a drawstring 58. The drawstring 58 is connected to the sheet of material 10c. The drawstring has opposite ends 60 and 62. Portions of the drawstring 58 near each of the opposite ends 60 and 62 thereof exit through respective openings 64 and 66 formed in the upper surface 20c of the sheet of material 10c.

The drawstring 58 extends circumferentially about the sheet of material 10c and the drawstring 58 is spaced a distance 68 from the outer peripheral edge 26c of the sheet of material 10c. The drawstring 58 may be connected to the sheet of material 10c in any suitable manner so desired in any particular application. In one preferred embodiment, the sheet of material 10c comprises a first sheet 70 and a second sheet 72 (FIG. 9). The drawstring 58 is disposed between the first and the second sheets 70 and 72 and the first and the second sheets 70 and 72 then are bondingly connected or laminated to form the sheet of material 10c. Portions of the first and the second sheets 70 and 72 near the drawstring 58 are left unconnected so that the drawstring 58 may slidingly move between the first and the second sheets 70 and 72. The openings 64 and 66 more particularly are formed through a portion of the first sheet 70. The first and the second sheets 70 and 72 are constructed of materials exactly like that described before with respect to the sheet of material 10.

The sheet of material 10c is formed about the flower pot 30 in the manner exactly like that described before with respect to the sheet of material 10 shown in FIGS. 1–4 and described in detail before. The drawstring 58 is positioned on the sheet of material 10c and the sheet of material 10c is sized and shaped so that, when the sheet of material 10c is formed about the flower pot 30, the drawstring 58 is disposed above the upper end 32 of the flower pot 30. In this position, the ends 60 and 62 of the drawstring 58 are pulled thereby drawing the portions of the sheet of material 10c generally near the drawstring 58 inwardly and crimping the portions of the sheet of material 10c near the drawstring 58 to form a crimped portion like the crimped portion 46 shown in FIGS. 2 and 3. The ends 60 and 62 of the drawstring 58 then are tied or otherwise secured to maintain the crimped portion formed in a decorative cover (not shown) formed by the sheet of material 10c.

The decorative cover (not shown) formed by the sheet of material 10c will look like the decorative cover 50 shown in FIGS. 2 and 3, except the crimped portion (not shown) is formed by pulling the drawstring 58 and the resulting adjacent portions of the sheet of material 10c are not bondingly connected in the manner described before with respect to the decorative cover 50. It should be noted that the sheet of material 10c also could include a cohesive or pressure sensitive adhesive bonding material on the upper surface 20c of the sheet of material 10c exactly like that described before with respect to the connecting bonding material 24 on the sheet of material 10 (FIGS. 1–4). In this embodiment, the adjacent portions of the sheet of material 10c formed when the drawstring 58 is pulled to form the crimped portion, also would be bondingly connected in a manner like that described before with respect to the decorative cover 50 and the crimped portion 46 (FIGS. 1–4). Also, the sheet of material 10c can be constructed like the sheet of material 10a shown in FIGS. 5 and 6 and described in detail before so that the adjacent portions of the lower surface 22c also are connected when the drawstring 58 is pulled to form the crimped portion.

Embodiment of FIGS. 10 and 11

Shown in FIGS. 10 and 11 is a modified sheet of material 10d which is constructed exactly like the sheet of material 10 shown in FIGS. 1–4 and described in detail before, except the sheet of material 10d also includes a pot connecting bonding material 80 disposed on the upper surface 20d of the sheet of material 10d. The pot connecting bonding material 80 extends circumferentially about the sheet of material 10d. The pot connecting bonding material 80 is spaced a distance 82 from the outer peripheral edge 26d of the sheet of material 10d and the distance 82 is greater than the distance 28d between the connecting bonding material 24d and the outer peripheral edge 26d. The pot connecting bonding material 80 is spaced a distance 84 from the connecting bonding material 24d.

The sheet of material 10d is formed about the flower pot 30 in a manner exactly like that described before in connection with the sheet of material 10 shown in FIGS. 1–4, except, in this embodiment, the sheet of material 10d is sized and shaped and the pot connecting bonding material 80 is positioned on the sheet of material 10d so that, when the sheet of material 10d is formed about the flower pot 30, the pot connecting bonding material 80 is disposed near the outer peripheral surface 36 and near the upper end 32 of the flower pot 30. In this position, the portions of the sheet of material 10d having the pot connecting bonding material 80 disposed thereon are pressed or positioned against the outer peripheral surface 36 of the flower pot 30 so that the pot connecting bonding material 80 bondingly engages and bondingly connects a portion of the sheet of material 10d to the outer peripheral surface 36 of the flower pot 30 generally near and adjacent the upper end 32 of the flower pot 30 for bonding a portion of the sheet of material 10d to the flower pot 30.

The sheet of material 10d thus is bonded to the flower pot 30 by way of the pot connecting bonding material 80 and the connection between the sheet of material 10d and the flower pot 30 extends circumferentially about the flower pot 30 generally near and adjacent the upper end 32 thereof.

In this embodiment, the crimped portion 46d and the ridge portion 48d cooperate to secure the sheet of material 10d in the form of the decorative cover 50d formed about the flower pot 30 and the pot connecting bonding material 80 also cooperates to maintain the sheet of material 10d in the form of the decorative cover 50d positioned about the flower pot 30. The pot connecting bonding material 80 thus augments the crimped portion 46d and the ridge portion 48d in maintaining the sheet of material 10d in the form of the decorative cover 50d secured about the flower pot 30.

The sheet of material 10d also could be constructed like the sheet of material 10a if desired. The sheet of material 10d also could be constructed like the sheet of material 10b to form the decorative cover 50d in a manner like that described before with respect to FIG. 7 if desired in a particular application. The sheet of material 10d also could include the drawstring in the manner described before with respect to the drawstring 58 shown in FIGS. 8 and 9 if desired in a particular application.

Embodiment of FIGS. 12 and 13

Shown in FIGS. 12 and 13 is another modified sheet of material 10e, which is constructed exactly like the sheet of material 10 shown in FIGS. 1–4 and described in detail before, except the sheet of material 10e does not necessarily include the connecting bonding material like the connecting bonding material 24 on the sheet of material 10 shown in FIGS. 1–4. The sheet of material 10e includes reinforcing elements 86 connected to the sheet of material 10e. The reinforcing elements 86 more particularly comprise a plurality of reinforcing elements with two reinforcing elements 88 and 90 being shown in FIGS. 12 and 13 by way of example. Each of the reinforcing elements 88 and 90 is connected to the sheet of material 10e. The reinforcing elements 88 and 90 each extend circumferentially about the sheet of material 10e. The reinforcing elements 88 and 90 are spaced about a distance 92 from the outer peripheral edge 26e of the sheet of material 10e.

The reinforcing elements 88 and 90 may be connected to the sheet of material 10e in any suitable manner. Preferably, the sheet of material 10e is formed using a first sheet 94 and a second sheet 96 (FIG. 13) with the reinforcing elements 88 and 90 being disposed between the first and the second sheets 94 and 96. In this position, the first and the second sheets 94 and 96 are bondingly connected or laminated together to form the sheet of material 10e. The first and the second sheets 94 and 96 are constructed of any of the materials described before in connection with the sheet of material 10 shown in FIGS. 1–4.

In this embodiment, the sheet of material 10e is formed about the flower pot 30 in the manner exactly like that described before in connection with the sheet of material 10 shown in FIGS. 1–4, except the crimped portion is maintained in the formed position by way of the reinforcing elements 88 and 90 which cooperate to maintain the portion of the sheet of material 10e in a crimped position to form a crimped portion such as the crimped portion 46 shown in FIGS. 2 and 3 and described in detail before.

The reinforcing elements 88 and 90 may be constructed of any type of material capable of maintaining the shape of the crimped portion of the decorative cover like the crimped portion (not shown) 46 of the decorative cover (not shown) 50 described before. The reinforcing elements 88 and 90 may be wire elements for example or plastic rods and the reinforcing elements 88 and 90 may be continuous as illustrated in FIG. 12 or in the form of segments as may be desired in a particular application.

It also should be noted that the sheet of material 10e can be formed about the flower pot 30 to provide a decorative cover (not shown) like the decorative cover 50b shown in FIG. 7 and described in detail before. It also should be noted that the sheet of material 10e may include connecting bonding material like the connecting bonding material 24 and/or connecting bonding material like the connecting bonding material 54 if desired in a particular application. In some instances, it also may be desirable to include a drawstring with the sheet of material 10e like the drawstring 58 shown in FIGS. 8 and 9 and described in detail before. It also should be noted that the sheet of material 10e may include pot connecting bonding material like the pot material bonding material 80 shown in FIGS. 10 and 11 for forming a decorative cover like the decorative cover 50d shown in FIG. 11 if desired in a particular application.

Embodiment of FIGS. 14 and 15

Shown in FIGS. 14 and 15 is yet another modified sheet of material 10f which is constructed in a manner exactly like the sheet of material 10 shown in FIGS. 1–4 and described in detail before, except the sheet of material 10f does not necessarily include a connecting bonding material like the connecting bonding material 24 described in detail before with respect to the sheet of material 10. The sheet of material 10f more particularly includes reinforcing elements 98.

The reinforcing elements 98 comprise a plurality of reinforcing elements 100 (only one of the reinforcing elements 100 being designated with the reference numeral in FIGS. 14 and 15). The reinforcing elements 100 may be constructed of any material and any shape so long as the reinforcing elements 100 cooperate with the sheet of material 10f to reinforce the sheet of material 10f and assist in maintaining the formed shape of the sheet of material 10f. In one form, the reinforcing elements 100 may comprise a plurality of wire elements or plastic rod like elements for example. The reinforcing elements 100 may be continuous as shown in FIGS. 14 and 15 or may be segmented as may be desired in a particular application. The reinforcing elements 100 extend over substantially the entire surface of the sheet of material 10f.

The sheet of material 10f is formed about the flower pot 30 in the manner described before in connection with FIG. 2 or 7, except, in this embodiment, the reinforcing elements 100 cooperate to maintain a portion of the sheet of material 10f formed in the form of the crimped portion like the crimped portion 46 or 46b in lieu of connecting bonding material.

The sheet of material 10f may include connecting bonding material like the connecting bonding material 24 or connecting bonding material like the cohesive connecting bonding material 54 if desired in a particular application. Also, the sheet of material 10f may include a drawstring like the drawstring 58 shown in FIG. 8 and described in detail before. Also, the sheet of material 10f may include a pot connecting bonding material like the pot connecting bonding material 80 shown in FIGS. 10 and 11 and described in detail before.

Embodiment of FIGS. 16 and 17

Shown in FIGS. 16 and 17 is still another modified sheet of material 10g which is constructed exactly like the sheet of material 10 shown in FIGS. 1–4 and described in detail before, except the sheet of material 10g does not include connecting bonding material like the connecting bonding material 24 on the sheet of material 10 shown in FIGS. 1–4. Rather, the sheet of material 10g includes a shrink material 102 disposed on the upper surface 20g of the sheet of material 10g. The shrink material 102 may be constructed of any material which shrinks when subjected to heat or liquid or some other outside force or fluid. Such materials are well known in the art.

The shrink material 102 extends circumferentially about the upper surface 20g of the sheet of material 10g. The shrink material 102 is spaced a distance 104 from the outer peripheral edge 26g of the sheet of material 10g.

The sheet of material 10g is formed about the flower pot 30 in the manner exactly like that described before in connection with FIG. 2 or 7. The shrink material 102 is positioned on the sheet of material 10g and the sheet of material 10g is sized and shaped so that the shrink material 102 is positioned above the upper end 32 of the flower pot 30 when the sheet of material 10g is formed about the flower pot 30 in a manner like that described before with respect to the positioning of the connecting bonding material 24 on the sheet of material 10 (FIGS. 1–4). In this position, the shrink material 102 then is subjected to heat or any of the other means mentioned before causing the shrink material 102 to shrink thereby forming the crimped portion 46g (FIG. 17). The crimped portion 46g will operate in a manner exactly like that described before with respect to the crimped portion 46 on the decorative cover 50 (FIGS. 2 and 3).

Embodiment of FIG. 18

Shown in FIG. 18 is a plurality of sheets of material 10h (only one of the sheets of material 10h being designated with a reference numeral in FIG. 18 for example). The sheets of material 10h are positioned and connected together to form a pad 106. The sheets of material 10h may be constructed in any of the forms of sheets of material described herein. In this embodiment, one of the sheets of material 10h in the pad 106 is removed from the pad 106 and formed about the flower pot 30 to provide a decorative cover (not shown) in any of the manners described herein. In the alternative, the flower pot 30 may be placed on one of the sheets of material 10h in the pad 106 and then formed about the flower pot 30 to provide the decorative cover in any of the manners described herein while simultaneously removing the sheet of material 10h from the pad 106.

Embodiment of FIG. 19

Shown in FIG. 19 is a roll of material 108 generally supported. In this embodiment, material from the roll of material 108 is unrolled and pulled from the roll of material 108 in a direction 110 to unroll a portion of the material from the roll of material 108. When a predetermined amount of the material has been unrolled from the roll of material 108, a knife edge 112 is brought into cutting contact with a portion of the material unrolled from the roll of material 108 to sever a sheet of material from the roll of material. The knife edge 112 may be automatically actuated by an actuator 114 which may be a hydraulic cylinder for example or the knife edge 112 may be a manually actuated knife edge or a knife edge on the edge of a container which contains the roll of material 108 for example.

In this embodiment, the material in the roll of material 108 is constructed of any of the materials described herein with respect to any of the sheets of material described herein to provide any of the sheets of material described herein. In this embodiment, the sheets of materials described herein are supplied in the form of the roll of material 108 and the sheets of material are severed from the roll of material 108 in the manner just described.

Embodiment of FIG. 20

Shown in FIG. 20 is a roll of material 116 which is generally supported. The material in the roll of material may be constructed of any of the materials described herein with respect to any of the sheets of material described herein. As shown in FIG. 20, the roll of material 116 contains a plurality of spaced apart bonding materials 24j disposed on the material and the roll of material 116. The material in the roll of material 116 also contains a line of perforations 118 (only two of the lines of perforations 118 being designated with a reference numeral in FIG. 20). The lines of perforations 118 separate the material in the roll of material 116 into a plurality of sheets of material 10j. Each of the sheets of material 10j is constructed in a manner exactly like the sheet of material 10 shown in FIGS. 1–4 and described in detail before.

In this embodiment, the material is unrolled from the roll of material 116 to a desired length. A portion of the material in the roll of material 116 then is separated from the roll of material 116 by tearing the material along one of the perforations 118 to provide the sheet of material 10j. The sheet of material 10j then is wrapped or formed about the flower pot 30 in any of the manners described herein.

It should be noted that the sheet of material 10j has been described before as being constructed like the sheet of material 10 shown in FIGS. 1–4, although the sheet of material 10j could be constructed like any of the other sheets of material described herein if desired in a particular application.

Embodiment of FIGS. 21, 22 and 23

Shown in FIG. 21 is a sheet of material 10k which is constructed in a manner exactly like the sheet of material 10 shown in FIG. 1 and described in detail before, except the sheet of material 10k also includes a plurality of strips of pot connecting bonding material 120 with the individual strips of the pot connecting bonding material 120 being designated in FIG. 21 by the individual reference numerals 120a, 120b, 120c, 120d 120e and 120f.

The strips of pot connecting bonding material 120 are spaced a distance circumferentially apart about the sheet of material 10k. Each of the strips of pot connecting bonding material 120 extend from a connecting bonding material 24k a distance radially inwardly toward a central portion of the sheet of material 10k. The strips of pot connecting bonding material 120 preferably are pressure sensitive adhesive pot connecting bonding materials. The strips of pot connecting bonding material 120 also could be a cohesive, however, in this instance, a corresponding strip of cohesive pot connecting bonding material also would be disposed on the flower pot 30 for reasons which will be made more apparent below.

The sheet of material 10k is formed about the flower pot 30 (FIGS. 22 and 23) in a manner exactly like that described before in connection with the sheet of material 10 (FIGS. 1–4) except, in this instance, portions of the upper surface 20k having the strips of pot connecting bonding material 120 disposed thereon are positioned adjacent a portion of the outer peripheral surface 36 of the flower pot 30 whereby the strips of pot connecting bonding material 120 bondingly engage and bondingly connect portions of the sheet of material 10k to the outer peripheral surface 36 of the flower pot 30. The strips of pot connecting bonding material 120 are positioned on the sheet of material 10k and sized so that the strips of pot connecting bonding material 120 each extend generally between the upper end 32 and the lower end 34 of the flower pot 30 when the portions of the sheet of material 10k having the strips of pot connecting bonding material 120 disposed thereon are positioned adjacent the outer peripheral surface 36 of the flower pot 30.

Since the strips of pot connecting bonding material 120 are spaced a distance apart circumferentially about the sheet of material 10k, portions of the sheet of material 10k will be bondingly connected to the outer peripheral surface 36 of the flower pot 30 while other portions of the sheet of material 10k will not be connected to the outer peripheral surface 42 of the flower pot 30 (FIGS. 22 and 23) forming a decorative cover 50k. More particularly, when the sheet of material 10k is connected to the flower pot 30, portions of the sheet of material 10k will be connected to the outer peripheral surface 36 of the flower pot 30 at positions extending between the upper end 32 and the lower end 34 of the flower pot 30 and extending a distance circumferentially about the flower pot 30 to form connected portions, while remaining portions of the sheet of material 10k extending between the upper end 32 and the lower end 34 of the flower pot 30 will not be connected to the flower pot 30 forming unconnected portions 124 (the specific or individual connected portions 122 being designated by the reference numerals 122a, 122b, 122c, 122d, 122e and 122f in FIG. 23 and the specific or individual unconnected portions being designated in FIG. 23 by the specific reference numerals 124a, 124b, 124c, 124d, 124e and 124f). Each connected portion 122–122f extends a distance circumferentially about the flower pot 30 and extends generally between the upper end 32 and the lower end 34 of the flower pot 30. Each unconnected portion 124–124f extends between the upper end 32 and the lower end 34 of the flower pot 30 and each unconnected portion 124–124f extends a distance circumferentially about the flower pot 30. Each unconnected portion 124 is disposed generally between two adjacent connected portions 122–122f, respectively.

The sheet of material 10k also could be constructed like the sheet of material 10a (FIGS. 5 and 6) or shaped to form an outwardly extending crimped portion like the crimped portion 46b (FIG. 7) or to include a drawstring like the drawstring 58 (FIGS. 8 and 9) or to include reinforcing elements like the reinforcing elements 86 (FIG. 12) or reinforcing elements like the reinforcing elements 98 (FIG. 14) or shrink material like the shrink material 102 (FIG. 16).

Embodiment of FIG. 24

Shown in FIG. 24 is a flower pot 30l which is constructed in a manner exactly like the flower pot 30 described in detail before, except the flower pot 30l includes strips of pot connecting bonding material 126 (only three strips of pot connecting bonding material 126 being shown in FIG. 24 and designated therein by the individual reference numerals 126a, 126b and 126c). The strips of pot connecting bonding material 126 are spaced apart circumferentially about the outer peripheral surface 36l of the flower pot 30l and each of the strips of pot connecting bonding material 126 extends between the upper and the lower ends 32l and 34l of the flower pot 30l.

The flower pot 30l may be used in connection with the sheet of material 10k shown in FIG. 21 where the strips of pot connecting bonding material 120 on the sheet of material 10k are cohesive pot connecting bonding materials and the strips of pot connecting bonding 126 on the flower pot 30l are cohesive pot connecting bonding materials. In this embodiment, the strips of pot connecting bonding material 120 on the sheet of material 10k cohesively bondingly engage and bondingly connect to the strips of pot connecting bonding material 126 on the flower pot 30l to form a decorative cover like that described before in connection with the decorative cover 50k (FIGS. 22 and 23).

The strips of pot connecting bonding material 126 also may be adhesive pot connecting bonding materials. In this instance, the flower pot 30l may be used in connection with a sheet of material like the sheet of material 10 shown in FIGS. 1–4 and described in detail before. In this embodiment, the sheet of material 10 (FIGS. 1–4) is formed about the flower pot 30l in the manner like that described before in connection with the sheet of material 10k (FIGS. 21–23) and the strips of pot connecting bonding material 126 adhesively bondingly engage and bondingly connect to portions of the sheet of material 10 (FIGS. 1–4) to form a decorative cover like decorative cover 50k (FIGS. 22 and 23).

The flower pot 30l also may be used in connection with any of the other sheets of material described herein.

Embodiment of FIG. 25

Shown in FIG. 25 is a sheet of material 10m which is constructed in a manner exactly like the sheet of material 10d (FIG. 10), except the sheet of material 10m does not necessarily include the connecting bonding material like the connecting bonding material 24d shown in FIG. 10 in connection with the sheet of material 10d. In this embodiment, the sheet of material 10m is formed about the flower pot 30 in the manner exactly like that described before in connection with the sheet of material 10d (FIGS. 10 and 11), except a pot connecting bonding material 80m is positioned on the sheet of material 10m so that a portion of the sheet of material 10m near the upper end 32 of the flower pot 30 is folded over and disposed adjacent a portion of the inner peripheral surface 42 of the flower pot 30 near the upper end of the flower pot 30. In this position, the pot connecting bonding material 80m is bondingly engaged with and bondingly connected to a portion of the inner peripheral surface 42 of the flower pot 30 near the upper end 32 thereof. The bonding engagement between the pot connecting bonding material 80m and the inner peripheral surface 42 of the flower pot 30 extends circumferentially about the flower pot 30.

The sheet of material 10m may be constructed like any of the other sheets of material described herein, except the pot bonding material 80m is positioned on the sheet of material 10m to bondingly engage and connect with a portion of the inner peripheral surface 42 of the flower pot 30.

Embodiment of FIG. 26

Shown in FIG. 26 is a modified flower pot 30n which is constructed in a manner exactly like the flower pot 30 described herein, except the flower pot 30n includes a pot connecting bonding material 128 disposed on a portion of the inner peripheral surface 42n of the flower pot 30n near and adjacent the upper end 32n of the flower pot 30n. The pot connecting bonding material 128 extends circumferentially about the inner peripheral surface 42n of the flower pot 30n.

The flower pot 30n may be used in connection with a sheet of material constructed exactly like the sheet of material 10 shown in FIGS. 1–4 and described in detail before, except the sheet of material 10 does not necessarily include a connecting bonding material like the connecting bonding material 24. In this embodiment, the sheet of material is formed about the flower pot 30n in a manner like that described before in connection with the sheet of material 10 (FIGS. 1–4), except a portion of the sheet of material 10 is folded over and adjacent a portion of the inner peripheral surface 42n of the flower pot 30n into bonding engagement with the pot connecting bonding material 128 for bondingly connecting the sheet of material to the flower pot 30n in a manner like that described before in connection with the sheet of material 10m (FIG. 25).

The pot connecting bonding material 128 as just described preferably is an adhesive pot connecting bonding material. The pot connecting bonding material 128 may be a cohesive pot connecting bonding material and, in this instance, the flower pot 30n would be used in connection with a sheet of material like the sheet of material 10m (FIG. 25) except the pot connecting bonding material 80m would be a cohesive pot connecting bonding material for cohesively engaging and cohesively bonding with the cohesive pot connecting bonding material 128 on the flower pot 30n.

The flower pot 30n also may be used in connection with any of the other sheets of material described herein, except portions of the sheet of material would be bondingly connected to the flower pot 30 by way of the pot connecting bonding material 128 and, in this instance, it is not necessary to form a crimped portion, although a crimped portion also could be formed if desired in any particular application.

Embodiment of FIGS. 27, 28 and 29

Shown in FIGS. 27, 28 and 29 is another modified sheet of material 10p which is constructed exactly like the sheet of material 10 shown in FIGS. 1–4 and described in detail before, except the sheet of material 10p does not necessarily include a connecting bonding material like the connecting bonding material 24. Rather, the sheet of material 10p includes a drawstring in the form of a ribbon 132 having opposite ends 134 and 136 connected to a portion of the lower surface 22p of the sheet of material 10p. More particularly, a portion of the ribbon 132 between the opposite ends 134 and 136 is connected to the lower surface 22p of the sheet of material 10p while portions of the ribbon 132 near each of the ends 134 and 136 are unconnected from the sheet of material 10p. The portions of the ribbon 132 near the opposite ends 134 and 136 which are unconnected to the sheet of material 10p each extend a distance from the sheet of material 10p. The ribbon 132 may be connected to the sheet of material 10p in any suitable manner. As shown in FIG. 28, the ribbon 132 is connected to the sheet of material 10p by way of an adhesive connecting bonding material 138. The ribbon 132 may be connected between two sheets as described before in connection with the drawstring 58 shown in FIGS. 8 and 9.

The portion of the ribbon 132 connected to the sheet of material 10p extends a distance circumferentially about the sheet of material 10p. The portion of the ribbon 132 connected to the sheet of material 10p is spaced a distance 140 from the outer peripheral edge 26p of the sheet of material 10p.

The sheet of material 10p is formed about the flower pot 30 (not shown) with a portion of the sheet of material 10p extending above the upper end 32 (not shown) of the flower pot 30. More particularly, the ribbon 132 is positioned on the sheet of material 10p so that, when the sheet of material 10p is formed about the flower pot 30, the ribbon 132 extends above the upper end 32 of the flower pot 30. In this position, the opposite ends of the ribbon 132 are cinched or drawn tight to gather the portions of the sheet of material 10p near and adjacent the ribbon 132 over the upper end 32 of the flower pot 30 to form a crimped portion 46p like the crimped portions 46 described before forming a decorative cover 50p. In this position, the opposite ends 134 and 136 of the ribbon 132 are tied or otherwise secured to the secure the ribbon 132 in the drawn or pulled position. Then, a bow 142 may be secured to the decorative cover 50p (FIG. 29) by adhesively connecting the bow 142 to either a portion of the ribbon 132 or a portion of the outer peripheral surface of the decorative cover 50p.

The sheet of material 10p also may be constructed like any of the other sheets of material described herein to bond to portions of the flower pot or to include connecting bonding materials for bondingly connecting adjacent portions of the sheet of material when the ribbon 132 is drawn tightly about the upper end 32 of the flower pot 30 for example.

As described herein, the various sheets of material are formed about the flower pot by hand forming the sheets of material about the flower pot and by hand crimping the material to form the crimped portions. It is contemplated that the forming of the sheet of material about the flower pot and the crimping of the sheet of material may be accomplished automatically or semi-automatically by way of a machine. For example, a machine may include pivoting elements or fingers which are automatically pivoted to move the sheet of material about the flower pot and position a sheet of material as described herein. In this instance, the fingers may include a separate element for forming the crimped portion or the element for forming the crimped portion may be a separate device such as halves of a donut shaped device which are moved inwardly to form the crimped portion after the sheet of material has been formed about the flower pot. In lieu of fingers or elements, the sheet of material may be blown by way of air jets or the like around the flower pot and then a crimping device may be disposed adjacent portions of the sheet of material to form the crimped portions.

It also is contemplated that the crimped portion may be formed by a strivet or band which is automatically applied to the sheet of material after the sheet of material has been formed about the flower pot with the strivet or band being positioned above the upper end of the flower pot.

Changes may be made in the construction of the various elements, components and assemblies described herein and changes may be made in the step or the sequence of steps of the methods described herein without departing from the spirit and the scope of the invention as defined in the following claims.

What is claimed is:

1. A method of forming a decorative cover comprising:
   providing a flat sheet of material having an upper surface, a lower surface and an outer peripheral edge and having an adhesive or cohesive pot connecting bonding material disposed upon a portion of the flat sheet of material;
   providing a drawstring or ribbon;
   providing a flower pot having an upper end, a lower end, an outer peripheral surface and an opening extending through the upper end providing access to a retaining space; and
   forming the flat sheet of material about the flower pot to a position wherein the portions of the sheet of material are bondingly connected directly to portions of the flower pot via the connecting bonding material to form a decorative cover about substantially the entire outer peripheral surface of the flower pot, and forming a crimped portion in the sheet of material after the sheet of material has been placed about the flower pot and wherein the step of forming the crimped portion is defined further as drawing the drawstring or forming the ribbon about the sheet of material to crimp a portion of the sheet of material and wherein the flat sheet of material is not formed into a decorative cover until after the flat sheet is placed about the flower pot.

2. The method of claim 1 wherein the step of forming the crimped portion is defined further as drawing the drawstring or ribbon to form the crimped portion in .a position extending circumferentially about the upper end of the flower pot.

3. The method of claim 1 wherein the step of providing a flat sheet of material is defined further as providing the flat sheet of material constructed of a material selected from a group of materials consisting of paper, metal foil, natural cloth, synthetic cloth, denim, burlap, polymer film, and combinations thereof.

4. The method of claim 1 wherein the step of providing the flat sheet of material is defined further as providing the sheet of material having a thickness in a range from about 0.1 mil to about 30 mils.

5. The method of claim 1 wherein the step of providing the flat sheet of material is defined further as providing the flat sheet of material having a thickness in a range from about 0.1 mil to about 5 mils.

6. The method of claim 1 wherein the step of providing the flat sheet of material is defined further as comprising:
   providing a roll of material;
   unrolling a portion of the material from the roll of material; and
   cutting a portion of the material unrolled from the roll of material to separate the flat sheet of material from the roll of material.

7. The method of claim 1 wherein the step of providing the flat sheet of material is defined further as providing a pad containing a plurality of flat sheets of material.

8. The method of claim 1 wherein the step of providing the flat sheet of material is defined further as comprising:
   providing a roll of material, the roll of material having a plurality of spaced apart lines of perforations with the material in the roll of material between the spaced apart lines of perforations forming the flat sheet of material; and
   tearing the flat sheet of material from the roll of material by tearing the material along one of the lines of perforations.

9. The method of claim 1 wherein the crimped portion extends a distance radially inwardly.

10. The method of claim 1 wherein the step of forming the crimped portion is defined further as forming at least one overlapping fold in a portion of the sheet extending above the upper end of the flower pot.

11. A method for forming a decorative cover comprising:
    providing a flat sheet of material having an upper surface and a lower surface and an outer peripheral surface, the flat sheet of material having a drawstring or ribbon connected thereto and the sheet having a pot connecting adhesive or cohesive bonding material disposed thereon;
    providing a flower pot having an upper end, a lower end, an outer peripheral surface and an opening extending through the upper end providing access to a retaining space;
    forming the flat sheet of material about the flower pot to a position wherein the sheet of material extends about substantially the entire outer peripheral surface of the flower pot with a portion of the sheet of material having the adhesive or cohesive bonding material thereon disposed adjacent a portion of the flower pot and bondingly connecting a portion of the sheet of material directly to the flower pot via the adhesive or cohesive bonding material; and drawing the drawstring or ribbon to secure the sheet of material in the position extending about the flower pot to form the decorative cover and wherein the flat sheet of material is not formed into a decorative cover until after the flat sheet is placed about the flower pot.

12. The method of claim 11 wherein the step of forming the sheet of material about the flower pot is defined further as forming the sheet of material about the flower pot to a position wherein the portion of the sheet of material having the drawstring or ribbon connected thereto extends a distance above the upper end of the flower pot and wherein the step of drawing the drawstring is defined further as drawing the drawstring to form a crimped portion in the sheet of material at a position above the upper end of the flower pot for cooperating to hold the flower pot in the form of the decorative cover extending about the flower pot.

13. The method of claim 11 wherein the step of drawing the drawstring or ribbon further comprises forming a crimped portion with the crimped portion extending circumferentially about the upper end of the flower pot.

14. The method of claim 11 wherein the step of providing the sheet of material is defined further as providing the sheet of material having a thickness in a range from about 0.1 mils to about 30 mils.

15. The method of claim 11 wherein the step of providing the sheet of material as defined further as providing the sheet of material having a thickness in a range from about 0.1 mils to about 5 mils.

16. The method of claim 11 wherein the step of providing the sheet of material is defined further as comprising:

providing a roll of material;

unrolling a portion of the material from the roll of material; and cutting a portion of the material unrolled from the roll of material to separate the sheet of material from the roll of material.

17. The method of claim 11 wherein the step of providing the sheet of material is defined further as providing a pad containing a plurality of sheets of material.

18. The method of claim 11 wherein the step of providing the sheet of material is defined further as comprising:

providing a roll of material, the roll of material having a plurality of spaced apart lines of perforations with the material in the roll of material between the spaced apart lines of perforations forming the sheet of material; and tearing the sheet of material from the roll of material by tearing the material along one of the lines of perforations.

19. The method of claim 13 wherein the step of forming the crimped portion is defined further as forming at least one overlapping fold in a portion of the sheet extending above the upper end of the flower pot.

* * * * *

UNITED STATES PATENT AND TRADEMARK OFFICE
CERTIFICATE OF CORRECTION

PATENT NO. : 6,226,853 B1
DATED : May 8, 2001
INVENTOR(S) : Donald E. Weder

It is certified that error appears in the above-identified patent and that said Letters Patent is hereby corrected as shown below:

Column 2,
Line 52, after word "peripheral" and before number "26" change word "surface" to word -- edge --.

Column 4,
Line 27, after word "peripheral" and before number "26" change word "surface" to word -- edge --.

Column 5,
Line 7, after word "portion" and before word "when" change number "48" to number -- 46 --
Line 9, after word "be" delete phrase "brought together or".

Column 6,
Line 36, after number "22b" and before word "the" add word -- of --.

Column 13,
Line 3, after word "bonding" and before number "126" add word -- material --.

Column 15,
Line 5, after word "to" and before word "secure" delete word "the".

Column 17,
Line 31, after word "material" and before word "defined" change word "as" to word -- is --.

Signed and Sealed this

Twenty-seventh Day of July, 2004

JON W. DUDAS
*Acting Director of the United States Patent and Trademark Office*